United States Patent [19]

Maehara

[11] Patent Number: 4,505,520
[45] Date of Patent: Mar. 19, 1985

[54] DEVICE FOR PREVENTING VEHICLE WHEELS FROM LOCKING

[75] Inventor: Toshifumi Maehara, Saitama, Japan

[73] Assignee: Akebono Brake Industry Co., Ltd., Tokyo, Japan

[21] Appl. No.: 463,267

[22] Filed: Feb. 2, 1983

[30] Foreign Application Priority Data

Feb. 12, 1982 [JP] Japan .................. 57-20758

[51] Int. Cl.³ .................. B60T 8/04
[52] U.S. Cl. .................. 303/119; 188/181 C
[58] Field of Search .......... 188/181 C; 303/6 C, 303/6 R, 111, 119

[56] References Cited

U.S. PATENT DOCUMENTS

| | | | |
|---|---|---|---|
| 3,066,988 | 12/1962 | McRae | 303/119 X |
| 3,282,232 | 11/1966 | Shepherd | 303/119 X |
| 3,764,182 | 10/1973 | Andreyko et al. | 188/181 C X |
| 3,980,344 | 9/1976 | Burckhardt | 303/119 X |
| 4,275,934 | 6/1981 | MacDonald | 303/119 |

Primary Examiner—Duane A. Reger
Attorney, Agent, or Firm—Toren, McGeady and Stanger

[57] ABSTRACT

In a device for preventing a wheel lock condition of a vehicle, a fluid passage switching valve is inserted in a rear wheel brake fluid pressure transmission system. The fluid pressure switching valve is closed during brake application in so far as it is within a braking force range in which a rear wheel braking force must be lower than a front wheel braking force. The speeds of revolution or deceleration of the front and rear wheels are compared by comparison means. When the comparison means detects that the deceleration of the front wheel becomes greater than the deceleration state of the rear wheel by a predetermined value, the fluid passage switching valve opens for a given length of time to allow the rear wheel brake fluid pressure to increase.

6 Claims, 4 Drawing Figures

DEVICE FOR PREVENTING VEHICLE WHEELS FROM LOCKING

BACKGROUND OF THE INVENTION

1. Field of the Invention

This invention relates to a device for preventing a wheel lock condition from occurring during brake application to a vehicle.

2. Description of the Prior Art

Generally, when a wheel braking force becomes excessively greater than a frictional force between the wheel and the surface of a road during brake application to a vehicle, a preferable rate of slip of the wheel on the road surface no longer can be maintained. Then, the slip rate increases and sometimes it increases to such an extent as to bring about a phenomenon called wheel lock. The wheel lock phenomenon in some cases separately occurs at front and rear wheels or sometimes simultaneously occurs at both the front and rear wheels on a frozen road surface. However, a condition in which a rear wheel locking condition independently takes place is generally regarded as most dangerous because it results in a tail swinging movement of the vehicle.

Heretofore, there have been made various contrivances for prevention of such a wheel locking condition. These contrivances of the prior art include, for example, a device called an antiskid device which restores the rotating force of the locked wheel by promptly lowering brake fluid pressure that has been applied thereto and a fluid pressure control valve such as a proportioning valve, etc. in which the brake fluid pressure on the rear wheel which tends to incur the wheel locking condition due to a shift of a load on the vehicle at the time of brake application is arranged to increase to a lower degree than that of the front wheel in accordance with a prescribed brake fluid pressure distribution ratio for the front and rear wheels.

However, these prior art contrivances have many shortcomings. In the case of the former example of them mentioned above, the reduction device for reducing the brake fluid pressure generally requires use of a considerably large operating mechanism of a pneumatic operating type. This presents problems in terms of space and cost and the device is not usable for general vehicles with the exception of some vehicles of limited kinds. The latter example of the prior art contrivances has an advantage in that it can be arranged into a compact size and at a relatively low cost. However, since this control valve is of the control type having a specific brake fluid pressure increasing characteristic without having any feedback function for feeding variations in the speed of revolution of the wheel back to the fluid pressure control system, the control valve has been incapable of adequately coping with the influence of transitively varying factors such as the condition of the load on the vehicle, the coefficient of friction of the road surface etc.

The present invention is directed to the solution of these problems which have been presented by these wheel lock preventing contrivances of the prior art.

SUMMARY OF THE INVENTION

It is an object of the present invention to provide a device for preventing the wheel lock condition, wherein rear wheel brake fluid pressure is allowed to increase in such a way as to prevent a braking force on the rear wheel from becoming excessively larger than that of the front wheel of the vehicle while the deceleration states of front and rear wheels are compared to obtain a brake control condition which is close to an ideal braking force distribution ratio for the front and rear wheels (i.e. brake control for keeping all wheels of the vehicle rotating at about the same speed). Since the control according to the invention is based on the result of comparison of the speeds or the degrees of deceleration of the front and rear wheels, the control remains unaffected by variations in the condition of load on the vehicle. For example, when wheel lock tends to occur at the rear wheel under a no load condition of the vehicle, or where a small increase in brake fluid pressure results in a large decelration of the rear wheel, the rise in the rear wheel brake fluid pressure is reduced to a greater degree. In case where wheel lock does not readily occur at the rear wheel under a large load condition, or where an increase in the brake fluid pressure results only in a gradual decelaration both at the front and rear wheels, on the other hand, the rise of rear wheel brake fluid pressure is either reduced to a slight degree or is not at all reduced. This is an advantage obtainable in accordance with the method of the present invention.

The device according to the invention is arranged in the following manner: A fluid passage switching valve is inserted, for example, in a rear wheel brake fluid pressure line leading to a rear wheel brake device and is arranged to be opened or closed by an electrical control circuit which compares the deceleration states of the front and rear wheels to have the speed of revolution of the rear wheel adjusted to that of the front wheel, so that an increased brake force can be obtained. A combination of the electric control circuit and the switching valve which includes an electromagnetic operation part suffices the essential arrangement required for the device. Compared with the prior art device of the type called the antiskid device, the wheel lock preventing device of the invention can be arranged into a very compact size at a much lower cost. The above stated electrical control circuit is arranged, for example, in the following manner: A voltage signal $V_F$ which is detected as a signal representative of the speed of front wheel revolution is compared with another voltage signal $V_R$ which is detected as a signal representative of the speed of the rear wheel revolution. When the result of comparison becomes $V_F - V_R = \Delta V$, wherein $\Delta V$ represents a small prescribed value, a signal is produced to cause the rear wheel brake fluid pressure to be increased. However, the rear wheel side tends to have an excessively larger brake force than the front wheel side and thus requires reduction in the brake fluid pressure in the actual operation of the device. Therefore, the signal of the above stated control circuit is actually arranged to open just for a very short period of time the normally closed type switching valve which is inserted in the rear wheel brake fluid pressure transmission line.

Although it depends on the shape and condition of the switching valve, the reason for having this valve opened just for a very short period of time is as follows: Pressure on the rear brake device side becomes lower than that of a master cylinder side. Therefore, if the transmission line is opened for an excessively long period of time, the rear wheel brake fluid pressure would be increased at an excessive rate and might result in a rear wheel lock condition. Whereas, the arrangement to have the rear wheel brake fluid pressure increased to a lesser degree on the other hand attains a required degree of the fluid pressure increase with this process of increasing it to a lesser degree repeatedly performed.

This control which is arranged to be performed by means of such a switching valve becomes necessary only when the braking force increases to a certain extent. When the braking force is low, the reduction of the rear wheel brake fluid pressure is not required, because rear wheel lock seldom takes place under such a condition.

In view of this, it can be said that the above stated switching valve which is inserted in the transmission line for the rear wheel brake fluid pressure would rather be arranged to be open at the time of a low braking pressure for the sake of control. The present inventor, therefore, has developed a wheel-lock preventing device having an electromagnetically operated switching valve which is arranged to mechanically open at the time of a low braking pressure or when the brake fluid pressure is low and to close when the braking pressure increases.

These and further objects and features of the invention will become apparent from the following detailed description of a preferred embodiment thereof taken in connection with the accompanying drawings.

DETAILED DESCRIPTION OF PREFERRED EMBODIMENT

Figure 1:
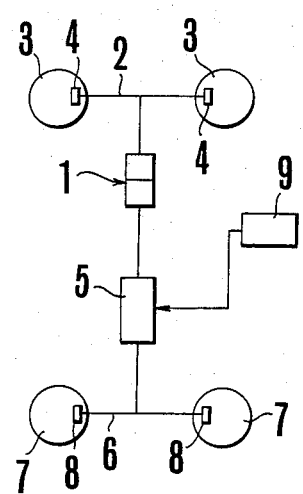
FIG. 1 is a schematic diagram showing the basic concept of the method of the present invention.

FIG. 1 shows a braking fluid pressure transmission piping system of a vehicle. A tandem type master cylinder 1 is arranged to produce fluid pressure within two discrete fluid chambers in response to a depressing operation on a brake pedal which is not shown. One of the fluid chambers communicates through a fluid pressure transmission tube 2 with the brake devices 4 of front wheels 3. The other fluid chamber communicates with the brake devices 8 of rear wheels 7 through a fluid pressure transmission tube 6 and a control valve 5 which is provided with an electromagnetic operation part as will be described later herein. The operation of the electromagnetic operation part of the control valve 5 is arranged to be operated by a central control circuit 9. In this specific embodiment, the speeds of revolution of the front and rear wheels on one side of the vehicle are detected by speed sensors 17 and 18. The deceleration states of these front and rear wheels are compared. The control valve 5 is operated to open or close according to the result of the comparison. The operation of the control valve 5 is such that the increase of brake fluid pressure transmitted from the master cylinder 1 to the rear wheel brakes 8 is controlled by the opening or closing of the valve to make the deceleration of the rear wheel approximately coincide with the deceleration state of the front wheel. Further, the detection of the front and rear wheels may be arranged to be done not only for the wheels on one side of the vehicle but also for all the wheels. The comparison of the speeds of front and rear wheels is not limited to arrangement to perform it through speed signals which are either digitally or analogically detected. The speed comparison may be also performed by comparing tracking signals representing the degrees of deceleration of these wheels. The purpose of control may be attained in any manner that brings the deceleration state of the rear wheel close to that of the front wheel. However, since it is more important for actual application of the invention to prevent a rear wheel locking condition, brake application is preferably controlled to allow the speed of revolution of the rear wheel to be a little higher than that of the front wheel or, in other words, to make the braking force on the rear wheel a little smaller than the ideal braking force distribution ratio.

The control over the transmission of the rear wheel brake fluid pressure is, for example, carried out in the following manner: The transmission line for the rear wheel brake fluid pressure is normally closed in so far as reduction in the rear wheel braking force is necessary. Accordingly, the rear wheel braking force does not increase while the fluid pressure of the master cylinder increases, that is, while the front wheel brake fluid pressure increases. When the difference between the rear wheel braking force and the front wheel braking force comes to exceed a given value, the transmission line for the rear wheel fluid pressure is opened after the lapse of a very short period of time. The rear wheel braking force is thus gradually increased in a stepwise manner. The difference between the front wheel braking force and the rear wheel braking force may be detected as difference in the speed of wheel revolution or as difference in deceleration.

Figure 2:
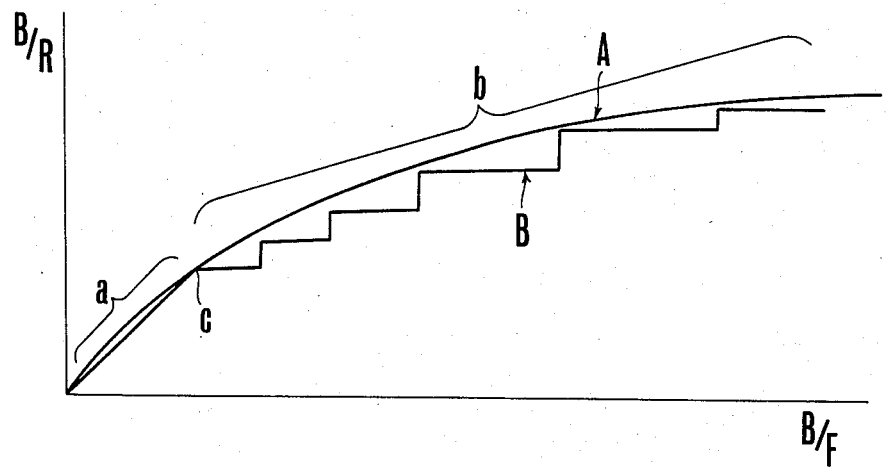
FIG. 2 is a graph showing a controlled state of a braking force obtained in accordance with the invented method.

The result of this control over the rear wheel braking force is as shown in FIG. 2, which shows a front wheel braking force B/F and a rear wheel braking force B/R are shown in relation to each other. A curve A represents ideal braking force distribution to the front and rear wheels while another curve B shows the control characteristic of the method of the present invention.

In other words, in so far as the road surface is normal and there is no fear of wheel lock with the brake applied within a low braking force range as indicated by a part a in FIG. 2, the brake fluid pressure is directly transmitted from the master cylinder to both the front and rear wheels to have the braking forces developed at the front and rear wheels alike. After that, when it becomes necessary to increase the braking force on the rear wheel at a lower increasing rate than the braking force increasing rate for the front wheel within another range of the braking force as represented by a range b in FIG. 2, the transmission line for the rear wheel brake fluid pressure is normally closed. Then, the actual deceleration states of the front and rear wheels are detected and compared with each other by the central control circuit. The transmission line for the rear wheel brake fluid pressure is opened for a very short period of time only when the relation between the front wheel revolution speed $V_F$ and the rear wheel revolution speed $V_R$ becomes $V_R - V_F = \Delta V$, wherein $\Delta V$ represents a prescribed value. The rear wheel braking force then increases as much as the brake fluid pressure that is allowed to be transmitted during this very short period of time. With this operation repeated, the braking force is controlled as represented by the curve B in FIG. 2.

The ideal braking force distribution to the front and rear wheels as shown by the curve A in FIG. 2 means that the front and rear wheels of the vehicle are kept in a state of rotating at the same speed. Meanwhile, in the case of the characteristic curve B, the rear wheel braking force is slightly lower than the ideal braking force distribution curve A. This indicates that the rear wheel is rotating at a higher speed than the front wheel to effectively preclude the fear of rear wheel lock and yet, in the meantime, the braking force for the whole vehicle is adequately maintained.

Figure 3:
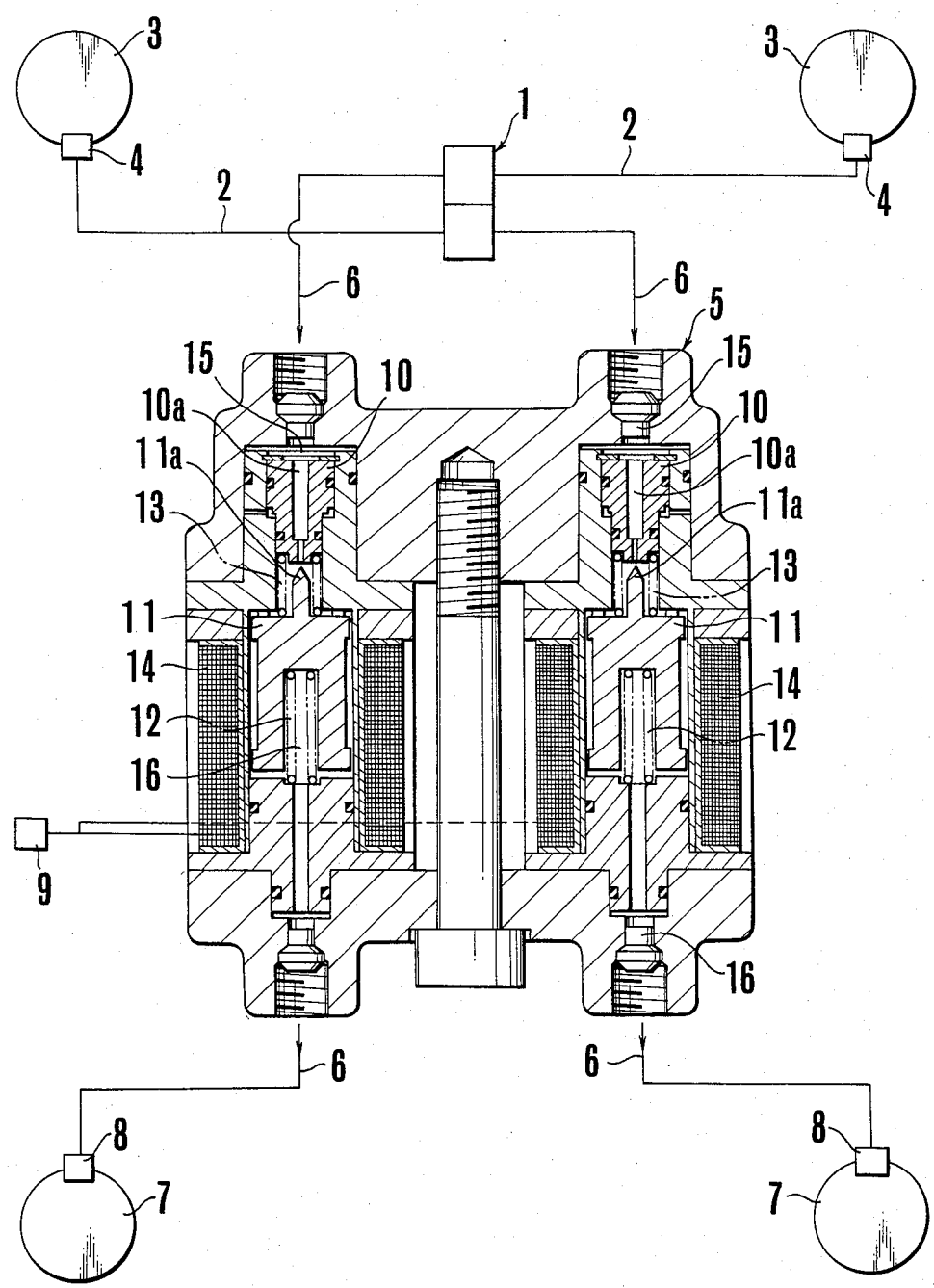
FIG. 3 is a sectional view showing a brake fluid pressure control system embodying the present invention as an embodiment thereof.

FIG. 3 shows an example of a switching valve inserted in a rear wheel brake system when the method of the present invention is applied to a vehicle brake system of the double piping type. Referring to FIG. 3, the brake system includes a tandem type master cylinder 1 and fluid pressure transmission tubes 2 which directly connect two fluid chambers of the master cylinder 1 respectively to the brake devices 4 of front wheels 3.

The above stated two fluid chambers are also connected to the brake devices 8 of rear wheels 7 through fluid pressure transmission tubes 6. These transmission tubes 6 respectively have fluid passage switching valves 5 inserted therein. These valves 5 are of the same construction and are separately arranged in left and right channels. Therefore, only one of them will be described hereinafter. The fluid passage switching valve 5 basically comprises a differential piston 10; an electromagnetic operation piston (armature) 11 which is provided with a needle valve part 11a; a set spring 12 for biasing these pistons into predetermined positions; a return spring 13; and a solenoid 14 which moves the electromagnetic operation piston 11 when energized. The switching valve 5 normally opens the fluid passage. When the transmitted brake fluid pressure reaches a prescribed value, the differential piston 10 moves to close the fluid passage. After that, the solenoid 14 is energized for a very short period of time to cause the electromagnetic operation piston 11 to open the fluid passage to permit some amount of fluid pressure to be transmitted to the rear wheel brake device.

Normally, the electromagnetic operation piston 11 is set in repose in a predetermined position by means of the set spring 12 with the needle valve part 11a thereof directed to a fluid passage opening port of the differential piston 10. With the solenoid energized, the piston 11 moves to retract the needle valve part 11a just to a very short extent against the force of the set spring 12 in the downward direction as viewed on the drawing. Meanwhile, the differential piston 10 which has a central passage 10a located opposite to the above stated needle valve part 11a. Normally, the piston 10 is biased by the return spring 13 toward a large diameter end side which opens to an input fluid chamber 15 communicating with the master cylinder. With the brake fluid pressure transmitted, the piston 10 is moved toward a small diameter end side (downward as viewed on the drawing) when a prescribed fluid pressure which is determined by a difference in area between the large diameter end and the small diameter end of the differential piston 10 and also by the spring force of the return spring 13. With the piston 10 moved in this manner, the open end of the central passage 10a comes to engage the needle valve part 11a of the electromagnetic operation piston 11 which is in repose. Then, the central passage 10a is closed by the needle valve part 11a. The valve 5 further includes an output fluid chamber 16 which communicates with the rear wheel brake device 8.

The energizing operation on the solenoid 14 is performed by a central control circuit 9, for example, in the following manner: The speeds of revolution of the front and rear wheels are detected and compared with each other. Then, the central control circuit 9 produces an energizing signal when the speed of the front wheel becomes lower than that of the rear wheel by a prescribed value.

The time for closing the fluid passage by the movement of the differential piston 10 may be suitably determined according to the characteristic of the vehicle. However, setting this timing for closing the fluid passage at an excessively low brake fluid pressure will not give a good effect. The intermittent transmission of brake fluid pressure by the movement of the needle valve part, 11a may be arranged to be effected in accordance with the shape of the valve part, etc. However, it goes without saying that arrangement to make the ratio of the prescribed value of the speed difference to the increase of the fluid pressure by the intermittent transmission small permits fine control.

The arrangement of the fluid passage switching valve as described in the foregoing enables to obtain the control characteristic for the front and rear wheel braking forces as represented by the curve B of FIG. 2.

Figure 4:
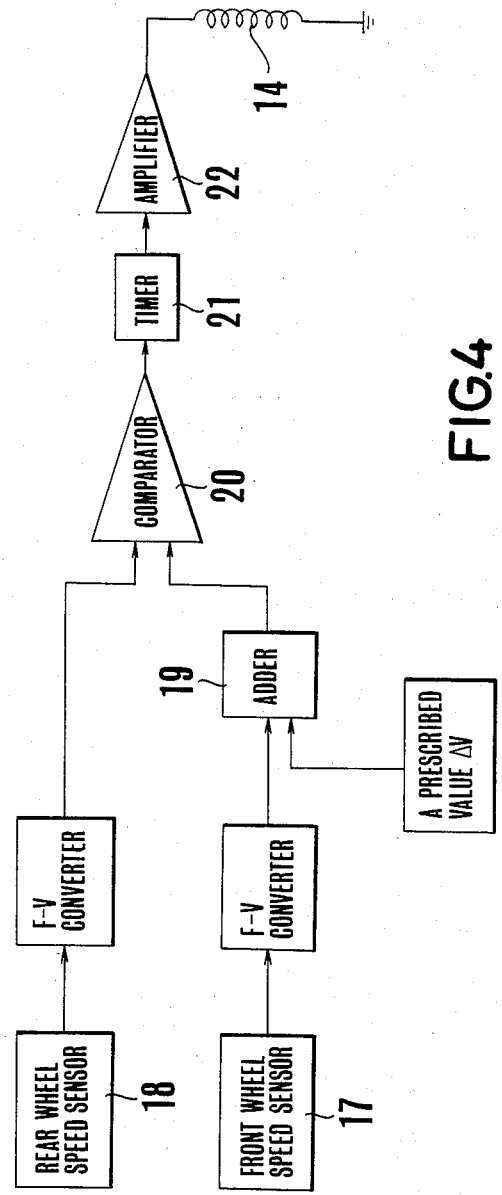
FIG. 4 is a block diagram showing an example of a control circuit according to the invention.

FIG. 4 shows an example of the central control circuit 9. Referring to FIG. 4, a voltage of a predetermined value which corresponds to the value $\Delta V$ mentioned in the foregoing is added by an adder 19 to the output voltage of a front wheel speed sensor 17. A comparator 20 compares the output voltage of the adder 19 with the output voltage of a rear wheel speed sensor 18. When the former becomes lower than the latter, the comparator 20 produces a signal to operate a timer 21 for a very short period of 10 to 20 msec. The solenoid 14 is then energized.

The embodiment operates as follows: The brake fluid pressure is normally transmitted to the rear wheel brake 8 through the input and output chambers 15 and 16 of the valve 5. When the brake fluid pressure reaches a prescribed value, the differential piston 10 moves against the force of the spring 13. The central passage 10a of the piston 10 comes to abut on the needle valve part 11a of the electromagnetic operation piston 11. This blocks the communication between the input chamber 15 and the output chamber 16. This point of time is represented by a point C in FIG. 2 After this point of time, further rise in the brake fluid pressure does not cause any increase in the brake fluid pressure on the rear wheel brake 8. Therefore, the speed of the rear wheel becomes higher than that of the front wheel. When difference between the two speeds reaches the preset value $\Delta V$ mentioned in the foregoing, the solenoid 14 is energized just for a very short predetermined period of time. With the solenoid energized, the piston 11 moves against the force of the spring 12 to open the passage 10a. With the passage 10a thus opened, the pressure on the rear wheel brake increases just for the predetermined period of time. After that, the passage 10a is again closed. After that, these processes of operation are repeated to cause the braking pressure on the rear wheel to increase stepwise as shown in FIG. 2.

In accordance with the present invention as has been described in the foregoing, the fear of rear wheel lock can be lessened to a much greater degree than the wheel lock preventing methods of the prior art. Despite the relatively simple construction thereof, the device according to the invention is capable of performing excellent control with the condition of the braking force fed back to the brake fluid pressure transmission system through detection of the revolution speeds of the wheels. The invention, therefore, has great utility.

I claim:

1. A wheel-lock preventing device comprising:
    an input fluid chamber communicating with a master cylinder;
    an output fluid chamber communicating with rear wheel brake devices;
    a differential piston disposed to separate the input and output fluid chambers from each other, said differential piston being arranged to move toward the output fluid chamber to a predetermined extent against the spring force of a return spring when the actions of fluid pressure from the two fluid chambers exceed a prescribed value, said return spring being arranged to return said differential piston to the original position thereof;
    a valve body member arranged to close fluid passage between said input and output fluid chambers by engaging the differential piston when the differential piston moves; and
    a driving device arranged to open said fluid passage by moving said valve body member.

2. A wheel-lock preventing device according to claim 1, wherein said fluid passage is formed so as to axially pierce through said differential piston.

3. A wheel-lock preventing device according to claim 1, wherein said driving device is an electromagnetic device.

4. A wheel-lock preventing device according to claim 1, wherein said valve body member is provided with a needle part which is arranged to engage an open end of said fluid passage.

5. A wheel-lock preventing device according to claim 1, wherein said return spring is interposed in between said differential piston and said valve body member.

6. A wheel-lock preventing device according to claim 3, wherein said valve body member is arranged to serve as an armature.

* * * * *